US012573351B2

(12) United States Patent
Yoshida et al.

(10) Patent No.: US 12,573,351 B2
(45) Date of Patent: Mar. 10, 2026

(54) ENHANCED REFRESH RATE SELECTION

(71) Applicant: Sony Interactive Entertainment Inc., Tokyo (JP)

(72) Inventors: Koichi Yoshida, Tokyo (JP); Sachiyo Aoki, Tokyo (JP); Yasunari Hatasawa, Tokyo (JP); Takahiro Aizawa, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 18/730,048

(22) PCT Filed: Jan. 19, 2023

(86) PCT No.: PCT/JP2023/001585

§ 371 (c)(1),
(2) Date: Jul. 18, 2024

(87) PCT Pub. No.: WO2023/145615

PCT Pub. Date: Aug. 3, 2023

(65) Prior Publication Data

US 2025/0118273 A1 Apr. 10, 2025

(30) Foreign Application Priority Data

Jan. 31, 2022 (JP) ................................ 2022-013441

(51) Int. Cl.
*G09G 5/00* (2006.01)

(52) U.S. Cl.
CPC ..... *G09G 5/003* (2013.01); *G09G 2340/0435* (2013.01)

(58) Field of Classification Search
CPC ............................................. G09G 2340/0435
See application file for complete search history.

(56) References Cited

U.S. PATENT DOCUMENTS

| | | | | |
|---|---|---|---|---|
| 8,542,221 | B1 | 9/2013 | Wyatt et al. | |
| 2016/0275916 | A1* | 9/2016 | Glen | G09G 5/395 |
| 2019/0371264 | A1 | 12/2019 | Koo et al. | |
| 2020/0402478 | A1 | 12/2020 | Her et al. | |
| 2021/0248973 | A1 | 8/2021 | Jeon et al. | |
| 2022/0051630 | A1* | 2/2022 | Shen | G09G 3/3291 |

FOREIGN PATENT DOCUMENTS

| | | | |
|---|---|---|---|
| JP | 2011-022593 | A | 2/2011 |
| WO | 2016/093127 | A1 | 6/2016 |

OTHER PUBLICATIONS

International Search Report and Written Opinion mailed on Mar. 28, 2023, received for PCT Application No. PCT/JP2023/001585 filed on Jan. 19, 2023, 10 pages including English Translation.

* cited by examiner

*Primary Examiner* — Gustavo Polo
(74) *Attorney, Agent, or Firm* — Fish & Richardson P.C.

(57) ABSTRACT

An information processing apparatus, which is connected to a display monitor and generates a video signal that is outputted to the display monitor and in which, in a case where a refresh rate for the display monitor is variable, one of a prescribed fixed refresh rate or a variable range that is for a variable refresh rate and is defined as a partial limited range from among a refresh range that the display monitor can support is selected by a prescribed limit range determination method, and the display monitor is controlled on the basis of the prescribed fixed refresh rate or the selected variable range pattern.

17 Claims, 4 Drawing Sheets

ENHANCED REFRESH RATE SELECTION

CROSS-REFERENCE TO RELATED APPLICATIONS

The present application is based on PCT filing PCT/JP2023/001585, filed Jan. 19, 2023, which claims priority from Japanese Patent Application No. 2022-013441, filed Jan. 31, 2022, the entire contents of each are incorporated herein by reference.

TECHNICAL FIELD

The present invention pertains to an information processing apparatus, a method for controlling an information processing apparatus, a program, and a recording medium.

BACKGROUND ART

A home game device or a personal computer in recent years has a graphics processor. This graphics processor sequentially draws images (frames) for display by a display monitor.

Here, an amount of time that the graphics processor requires to draw each frame differs for each frame, in accordance with, inter alia, the details of the drawing, the capability and resolution of the graphics processor, and a refresh rate. Accordingly, there can arise a situation such as the graphics processor not completing drawing of a frame before a point in time at which display of the next frame should be started. In such a case, a video signal based on the previous frame is outputted to the display monitor, and a phenomenon such as what is called stuttering or tearing arises.

Accordingly, in recent years, consideration has been given to a technique such as what is called a variable refresh rate, which dynamically causes the refresh rate of a display monitor to change in order to flexibly support differences in amounts of drawing time for each frame. Under a variable refresh rate, ideally, even if drawing by an information processing apparatus is delayed, the display monitor can wait for completion of the drawing before displaying the next frame.

SUMMARY

Technical Problem

However, for example, depending on the model of a display monitor, there are cases where limitations are imposed on respective amounts of change between an upper limit and lower limit for the display time period (that depends on the refresh rate) of a certain frame and the upper limit and lower limit for the display time period of the next frame. For example, in a case where the upper limit of the display time period for a certain frame is approximately 20.8 milliseconds (a refresh rate of 48 Hz) and the lower limit is approximately 16.7 milliseconds (a refresh rate of 60 Hz), there are display monitors that do not enable a change such as setting the lower limit of the display time period for the next frame to 10 milliseconds (a refresh rate of 100 Hz) or setting the upper limit to approximately 14.3 milliseconds (a refresh rate of 70 Hz).

When the display time period for the next frame that an information processing apparatus side requires of such a display monitor (hereinafter, referred to as a limited display monitor) exceeds this limitation, there are cases where display of subsequent frames is not in accordance with requirements from the information processing apparatus side.

Accordingly, the information processing apparatus needs to perform processing that gives consideration to a display monitor that has a requirement for control of the display time period of a frame, as with the example of the limited display monitor described above. However, for example, a result of limiting the required display time period for a frame according to a model of the display monitor is that development of a program (such as a game application), which performs screen drawing and is executed by the information processing apparatus, becomes troublesome.

The present invention is made in light of the actual circumstances described above, and one objective thereof is to provide an information processing apparatus that enables development of a program that the information processing apparatus itself executes, without consideration for a model of the display monitor.

Solution to Problem

One aspect of the present invention that solves the problem of the conventional example described above is an information processing apparatus that is connected to a display monitor and generates a video signal that is outputted to the display monitor. The information processing apparatus includes a selection unit that, in a case where a refresh rate for the display monitor is variable, selects, by a prescribed limit range determination method, one of a prescribed fixed refresh rate or a variable range that is for a variable refresh rate and is defined as a partial limited range from among a refresh range that the display monitor can support, and a display monitor control unit that controls the display monitor on the basis of the prescribed fixed refresh rate or the variable range selected by the selection unit.

Advantageous Effect of Invention

By virtue of one aspect of the present invention, a setting for a fixed refresh rate or a variable refresh rate in a variable range that satisfies a limitation imposed by a limited display monitor, for example, is selected, and therefore it is possible to simplify program development, without requiring consideration of the model of a display monitor when developing a program that is executed by an information processing apparatus itself.

DESCRIPTION OF EMBODIMENT

With reference to the drawings, description is given regarding an embodiment of the present invention. An information processing apparatus 1 according to an example of the embodiment of the present invention is, inter alia, a home game device, for example, and is used by being connected to a display monitor 2.

Figure 1:
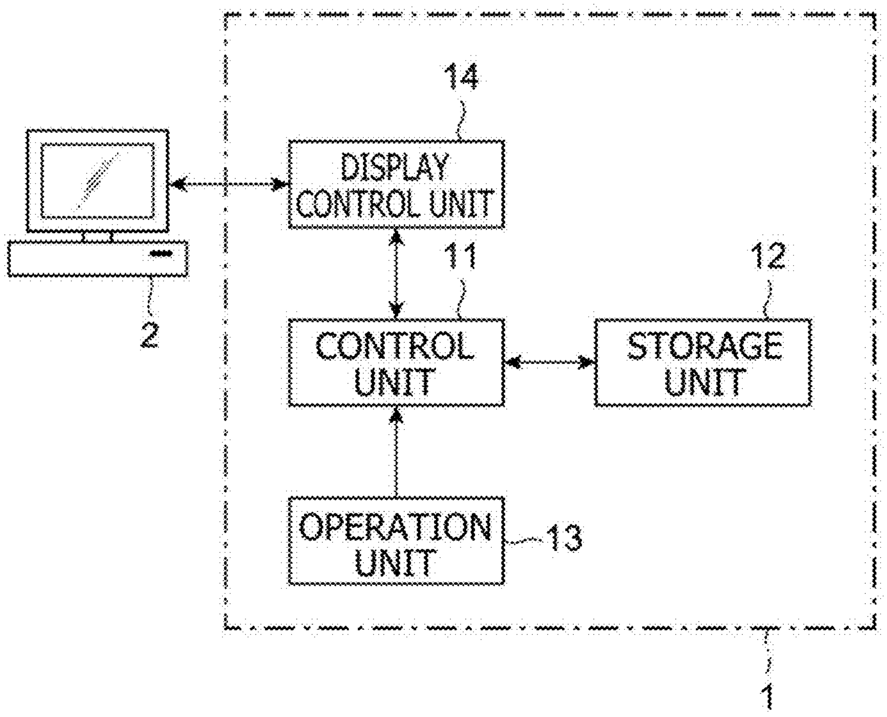
FIG. 1 is a block view that represents a configuration example and a connection example for an information processing apparatus according to an embodiment of the present invention.

As exemplified in FIG. 1, this information processing apparatus 1 includes a control unit 11, a storage unit 12, an operation unit 13, and a display control unit 14. In addition to these configurations, this information processing apparatus 1 may include, inter alia, a network interface.

The control unit 11 is a program control device (at least one processor), such as a central processing unit (CPU), for example. In the example of the present embodiment, this control unit 11 executes processing in accordance with each of an application program and a system program, which are stored in the storage unit 12.

Here, an application program is a program for a game application, for example, and a setting regarding usage of a variable refresh rate may be made in advance. In addition, the control unit 11 repeatedly executes processing for drawing a screen (a frame), in accordance with this application program.

In addition, the system program manages operation by the application program and, in a case where the refresh rate of the connected display monitor 2 is variable, selects one variable range pattern stored in the later-described storage unit 12 or one prescribed fixed refresh rate, controls the display monitor 2 on the basis of the selected variable range pattern or prescribed fixed refresh rate, and performs control so as to output, to the display monitor 2 at a prescribed timing determined by the selected variable range pattern or prescribed fixed refresh rate, each video signal based on each frame drawn by the application program. Operation by this control unit 11 is described later.

The storage unit 12 (a storage device) includes a memory device and a disk device such as a solid state drive (SSD) or a hard disk drive (HDD), and holds a program that is executed by the control unit 11. In addition, this storage unit 12 holds at least one variable range pattern, which expresses a range for a variable refresh rate that is used when the program is executed. Furthermore, this storage unit 12 also operates as a work memory for the control unit 11. Note that the program held in the storage unit 12 may be provided after being stored in a computer-readable and non-transitory recording medium and then copied to the storage unit 12.

Here, description is given regarding an example of defining this variable range pattern. In an example of the present embodiment, this variable range pattern is defined by a lower limit Rmin and an upper limit Rmax. When the variable range pattern is defined, the lower limit Rmin and the upper limit Rmax are defined as follows, for example. In other words, even in a case where output is performed at the lower limit Rmin refresh rate for a certain frame and output is performed at the upper limit Rmax refresh rate for the next frame, the variable range pattern is defined by selecting a combination of a lower limit and an upper limit of the refresh rate that can be used regardless of the type of the display monitor 2 (that is, without violating the limitations of the display monitor 2 even if the display monitor 2 is a limited display monitor).

Figure 2:
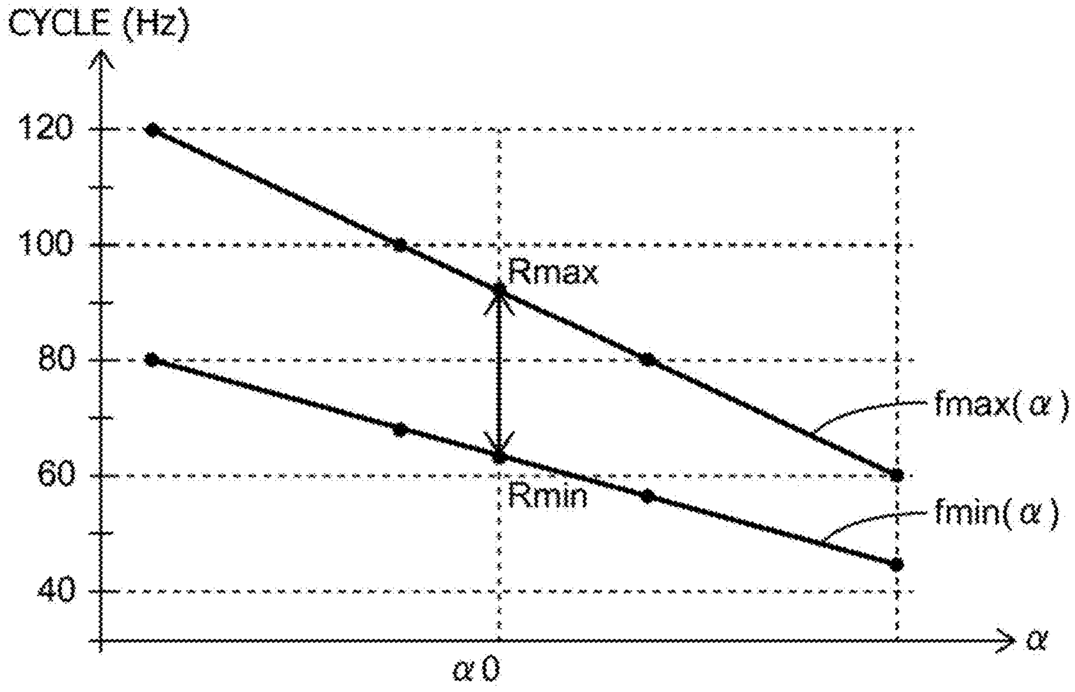
FIG. 2 is an explanatory view that represents an example of prescribed functions that are used by the information processing apparatus according to the embodiment of the present invention.

Specifically, as an example, when it is assumed that there is a limitation to a rate of fluctuation for refresh rates between two adjacent frames in a limited display monitor, a combination of Rmax and Rmin may be determined such that Rmax/Rmin is included in a range for the rate of fluctuation (for example, $Rmax/Rmin<\gamma$). As exemplified in FIG. 2, for example, this combination can be defined using a pair of prescribed functions $fmax(\alpha)$ and $fmin(\alpha)$ that relate to each other and both monotonically increase with respect to an optionally defined parameter value $\alpha$. FIG. 2 exemplifies that $Rmax=fmax(\alpha0)$ and $Rmin=fmin(\alpha0)$ at a time of a certain $\alpha=\alpha0$.

Here, $fmax(\alpha)$ and $fmin(\alpha)$ are defined such that, when the immediately prior refresh rate is $fmax(\alpha)$ for a certain $\alpha$, the limitations of the limited display monitor will not be violated even if the next refresh rate is set to $fmin(\alpha)$ and, for this $\alpha$, when the immediately prior refresh rate is $fmin(\alpha)$, the limitations of the limited display monitor will not be violated even if the next refresh rate is set to $fmax(\alpha)$. For example, when the upper limit for the rate of fluctuation of the refresh rates between two adjacent frames is $\gamma$ as described above for a limited display monitor, in this example, each function for $fmax(\alpha)$ and $fmin(\alpha)$ is defined such that $fmax(\alpha)/fmin(\alpha)<\gamma$ holds true for an optionally defined $\alpha$.

In other words, in the example of the present embodiment, in a case where the display monitor 2 connected to the information processing apparatus 1 supports a variable refresh rate, the information processing apparatus 1 determines the above-described parameter value $\alpha$, whereby it is assumed that a limited limit range (a range defined by the upper limit $Rmax=fmax(\alpha)$ and the lower limit $Rmin=fmin(\alpha)$), which is a portion from among a refresh rate range that the display monitor 2 can support, is used as a variable range for the refresh rate.

The operation unit 13 accepts a user operation input from an input device, and outputs the operation input to the control unit 11. This input device is a mouse or a keyboard if the information processing apparatus 1 is a personal computer, or a game controller or the like if the information processing apparatus 1 is a home game device.

According to an instruction inputted from the control unit 11 and at an instructed timing (an update timing), the display control unit 14 generates a video signal representing a frame that is inputted from the control unit 11, and outputs the video signal to the display monitor 2.

The display monitor 2 receives input of a video signal for one frame from the information processing apparatus 1, and displays the video signal at a prescribed timing. This timing is at a certain cycle in a case where the display monitor 2 does not support a variable refresh rate. In addition, in a case where a variable refresh rate is supported, this timing is basically designated from the information processing apparatus 1. Operation by this display monitor 2 is widely known, and detailed description here is omitted.

Note that the display monitor 2 can output, to the information processing apparatus 1, information that represents whether or not the display monitor 2 itself supports a variable refresh rate or represents whether or not the display monitor 2 itself is a limited display monitor.

Figure 3:
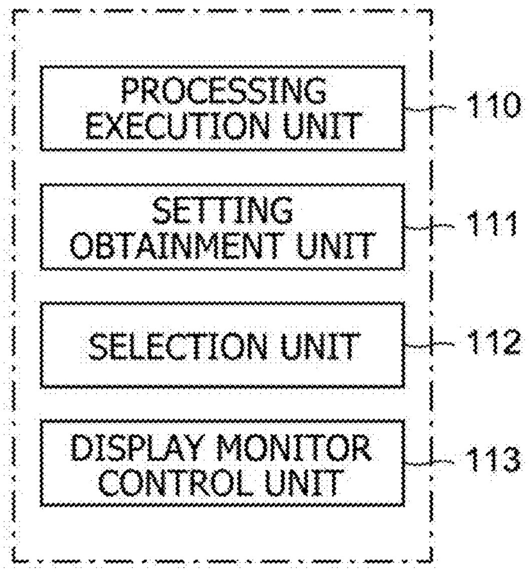
FIG. 3 is a functional block diagram that represents an example of the information processing apparatus according to the embodiment of the present invention.

Next, description is given regarding operation by the control unit 11 in the present embodiment. The control unit 11 in the present embodiment, for example, executes one process for a system program to thereby realize a configuration that functionally includes a processing execution unit 110, a setting obtainment unit 111, a selection unit 112, and a display monitor control unit 113, as exemplified in FIG. 3.

The processing execution unit 110 executes processing for an application program. This processing execution unit 110 repeatedly performs, inter alia, drawing of a screen (a frame), in accordance with the application program. In addition, while an application program that uses a variable refresh rate is executed, this processing execution unit 110 may output, to the display monitor control unit 113, a value for a target refresh rate, according to an instruction by the application program. The setting obtainment unit 111 obtains a setting for usage of a variable refresh rate by an application program that the processing execution unit 110 is trying to execute.

In this example, it is assumed that the application program employs any one of the following settings regarding usage of a variable refresh rate:

(1) DONT USE—a setting not to use a variable refresh rate;

(2) first usage mode—a setting that is for using a variable refresh rate but does not allow the refresh rate to be increased even if there is enough capacity for processing; and (3) second usage mode—a setting that is for using a variable refresh rate and, when there is enough capacity for processing, causes the refresh rate to increase to a host processing ability (the number of frames that can be drawn per second) or an upper limit supported by the display monitor 2.

Needless to say, these settings are examples, and there may also be a setting that uses defaults for a display, or a setting for forcibly using a variable refresh rate.

The selection unit 112 obtains, from the display monitor 2 connected to the information processing apparatus 1, information expressing whether or not the display monitor 2 supports a variable refresh rate. In a case where the display monitor 2 supports a variable refresh rate, the selection unit 112 selects a variable range pattern that the storage unit 12 is holding or a prescribed fixed refresh rate. In the example of the present embodiment, this selection unit 112 selects a variable range pattern being held by the storage unit 12 or a prescribed fixed refresh rate by referring to a setting (a refresh rate setting) that is regarding usage of the variable refresh rate, is obtained by the setting obtainment unit 111, and is designated by a relation with the application program executed by the processing execution unit 110.

The selection unit 112 in this example selects the prescribed fixed refresh rate if the setting regarding usage of a variable refresh rate obtained by the setting obtainment unit 111 is (1) DONT USE. The fixed refresh rate selected by the selection unit 112 here may be defined according to a refresh rate supported by the connected display monitor 2. For example, if the connected display monitor 2 supports a refresh rate that is equal to or greater than 120 Hz, the selection unit 112 selects 120 Hz (a fixed refresh rate) as the prescribed fixed refresh rate.

In contrast, if the setting regarding usage of a variable refresh rate obtained by the setting obtainment unit 111 is (2) the first usage mode or the second usage mode (in other words, if there is a setting for using a variable refresh rate), the selection unit 112 selects one variable range pattern held by the storage unit 12, for example, a variable range pattern that has a lower limit Rmin=48 Hz and an upper limit Rmax=60 Hz.

Operation by the selection unit 112 indicated here is an example. In the present embodiment, the selection unit 112 may use another method to select a variable range pattern held by the storage unit 12 or a prescribed fixed refresh rate. Other examples are further exemplified below.

Note that, in a case where the display monitor 2 connected to the information processing apparatus 1 does not support a variable refresh rate, the selection unit 112 selects, as the fixed refresh rate, a refresh rate for the display monitor 2.

The display monitor control unit 113 controls the display monitor 2 on the basis of the variable range pattern or the prescribed fixed refresh rate that has been selected by the selection unit 112. Specifically, in a case where the selection unit 112 has selected the prescribed fixed refresh rate, the display monitor control unit 113 outputs the video signal for a frame drawn by the processing execution unit 110 to the display monitor 2 at each timing that is defined by the fixed refresh rate Rf (every 1000/Rf milliseconds).

In addition, in a case where the selection unit 112 has selected a variable range pattern, the display monitor control unit 113 outputs the lower limit Rmin and the upper limit Rmax of the refresh rate, which are indicated by the selected variable range pattern, to the display monitor 2. In addition, every time the processing execution unit 110 completes drawing of a frame, this display monitor control unit 113 outputs a video signal for the drawn frame to the display monitor 2.

One Example of Operation

The information processing apparatus 1 according to the example of the present embodiment is provided with the above configuration, and operates as follows. Note that, in order to simplify the description below, it is assumed that a pattern in which the lower limit Rmin=48 Hz and the upper limit Rmax=60 Hz is defined as the variable range pattern and that information expressing this variable range pattern is stored in the storage unit 12.

Figure 4:
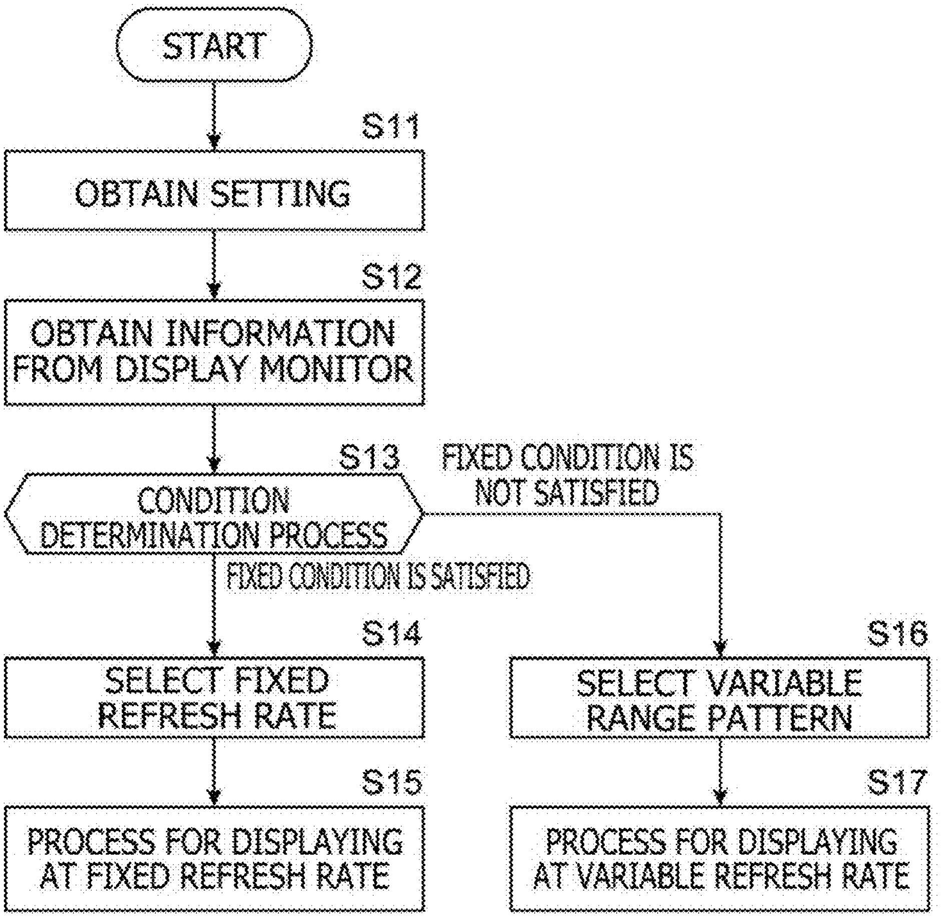
FIG. 4 is a flow chart that represents one example of operation by the information processing apparatus according to the embodiment of the present invention.

When a user instructs activation of an application program, the information processing apparatus 1 starts processing that is exemplified in FIG. 4, and obtains a setting regarding usage of a variable refresh rate pertaining to the activated application program (S11). In addition, the information processing apparatus 1 obtains, from the connected display monitor 2, information expressing whether or not the display monitor 2 supports a variable refresh rate (S12).

The information processing apparatus 1 executes a condition determination process (S13), and in a case where any one of the following conditions (referred to as fixed conditions):

(a) using the information obtained in step S12, it is determined that the display monitor 2 does not support a variable refresh rate;

(b) the setting, which is regarding usage of a variable refresh rate for the application program and has been obtained in step S11, is DONT USE (do not use a variable refresh rate); and (c) a setting not to use a variable refresh rate is selected as a system setting in the information processing apparatus 1 is satisfied (S13: a fixed condition is satisfied), selects the prescribed fixed refresh rate (S14). Note that (b) and (c) result from an application program or a system program requiring operation at a fixed refresh rate irrespective of whether or not the display monitor 2 supports a variable refresh rate, and correspond to settings for forcing a fixed refresh rate.

In addition, the fixed refresh rate selected here is set to a refresh rate that is predefined (a base refresh rate) and is used when the connected display monitor 2 is caused to operate at a fixed refresh rate.

In this case, the information processing apparatus 1 hereinafter updates display of a frame in the display monitor 2 at the determined fixed refresh rate (S15: display process at fixed refresh rate).

In contrast, in a case where none of the abovementioned conditions are satisfied in step S13, that is, in a case where:

(a) the display monitor supports a variable refresh rate;

(b) the setting regarding usage of the variable refresh rate obtained in step S11 permits a variable refresh rate, such as the first usage mode or the second usage mode; and (c) there is no system setting in the information processing apparatus 1 for not using a variable refresh rate, (S13: when a fixed condition is not satisfied), the information processing apparatus 1 selects a variable range pattern having a lower limit Rmin=48 Hz and an upper limit Rmax=60 Hz (S16).

In this case, the information processing apparatus 1 outputs the lower limit Rmin and the upper limit Rmax of the refresh rate, which are indicated by the variable range pattern selected in step S16, to the display monitor 2 and subsequently, every time drawing of a frame completes according to processing by the application program, outputs a video signal for the drawn frame to the display monitor 2 (S17).

Figure 5:
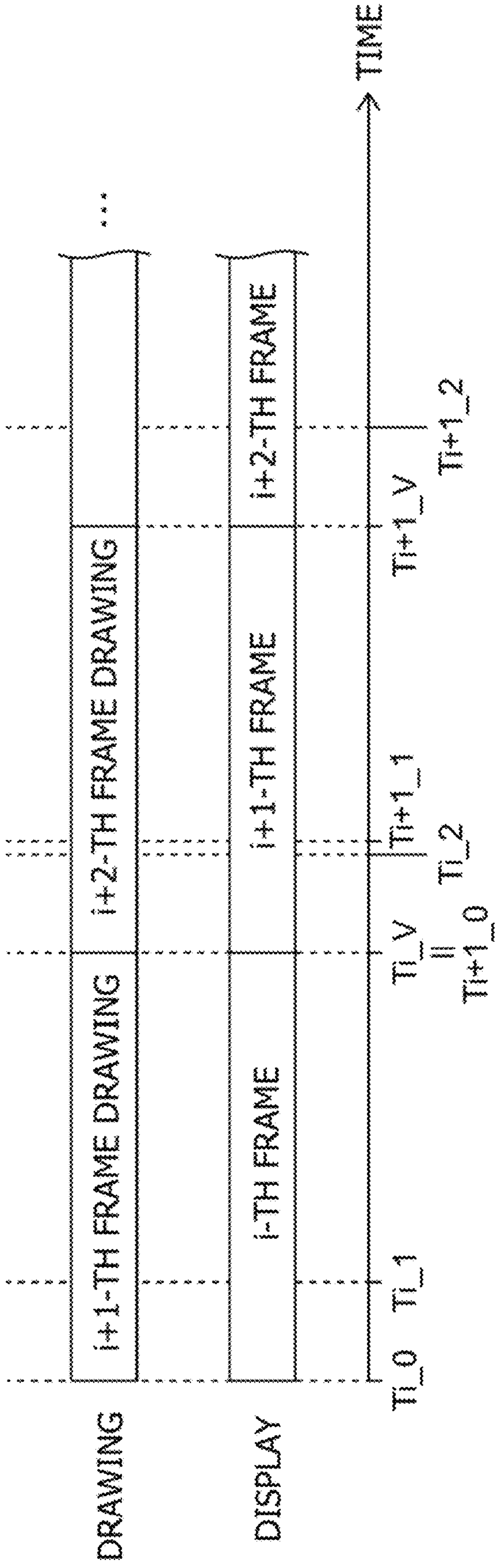
FIG. 5 is an explanatory view that represents an example of timings for drawing and display using the information processing apparatus according to the embodiment of the present invention.

As exemplified in FIG. 5, a display start time point for the current frame (set as the i-th frame) is set as Ti_0, a time point that is later by Vmin=1000/Rmax milliseconds from Ti_0 is set as Ti_1, and a time point that is later by Vmax=1000/Rmin milliseconds from Ti_1 is set as Ti_2. According to this example of the present embodiment, as exemplified in FIG. 5, when the information processing apparatus 1 outputs a video signal for the drawn i+1-th frame at a time point Ti_V that is between the abovementioned time point Ti_1 and the time point Ti_2, the display monitor 2 starts display of the video for the drawn i+1-th frame at this time point Ti_V (in other words, this time point becomes the display start time point Ti+1_0 for the next frame).

Similarly for the next frame, when the information processing apparatus 1 outputs a video signal for the drawn i+2-th frame at a time point Ti+1_V that is between a time point Ti+1_1 and a time point Ti+1_2, the display monitor 2 starts display of the video for the drawn i+2-th frame from this time point Ti+1_V. However, a time point that is later by Vmin=1000/Rmax milliseconds from the frame display start time point Ti+1_0 is set as Ti+1_1. A time point that is later by Vmax=1000/Rmin milliseconds from Ti+1_1 is set as Ti+1_2.

At this time, the difference between the refresh rates Ri=1000/Ri_V and Ri+1=1000/Ri+1_V for adjacent frames is between the abovementioned Rmin and Rmax no matter how the application program performs processing, and is within a range of limitation for a limited display monitor 2. In other words, it is possible to simplify program development, without requiring consideration of the model of the display monitor 2 when a program that is executed by the information processing apparatus 1 is developed.

[Condition for Selecting Variable Range Pattern]

In the description thus far, when the display monitor 2 supports a variable refresh rate (condition (a)), (b) taking whether or not a system setting is to use a variable refresh rate as a condition, (c) taking whether or not an application program to be executed has a setting for using a variable refresh rate as a condition, or a combination of conditions (b) and (c), the information processing apparatus 1 determines whether to select a variable range pattern or select a fixed refresh rate. However, a condition for selecting a variable range pattern in the present embodiment is not limited to those thus far and furthermore, for example, the abovementioned (c) may be set to (c') a condition of the application program to be executed having a setting for using a variable refresh rate and having a setting for the first usage mode (or the second usage mode).

In a case of using this (c') condition, a variable range pattern is selected when there is a system setting for using a variable refresh rate, the display monitor 2 supports a variable refresh rate, and the application program to execute is set to use a variable refresh rate and is set to the first usage mode (or the second usage mode). Note that these conditions are examples, and other conditions may also be used.

Furthermore, the information processing apparatus 1 may use the base refresh rate and a refresh rate variable range belonging to the display monitor 2 to determine whether to select a variable range pattern or select a fixed refresh rate.

For example, in a case of determining to select a variable range pattern, the information processing apparatus 1 first operates by selecting a variable range pattern for a variable refresh rate for when a base refresh rate (BRR) is 60 Hz (in other words, in a case of HDMI 2.1, a variable range pattern for which the upper limit Rmax is 60 Hz). Subsequently, as the capability of the display monitor 2, if the upper limit Rmax of the variable range for the refresh rate thereof is 120 Hz or more, for example, and the display monitor 2 is not a limited display monitor, operation is performed by appropriately selecting, from among held variable range patterns, a variable range that is indicated by a variable range pattern and is within the variable range for the refresh rate of the display monitor.

However, even in a case where it is determined to select a variable range pattern once, operation may be performed by selecting a fixed refresh rate in a case where, as the capability of the display monitor 2, the base refresh rate BRR for when the fixed refresh rate is set is 120 Hz, whereas the refresh rate upper limit Rmax for when a variable refresh rate is selected is less than this BRR=120 Hz, or in a case where the display monitor 2 is a limited display monitor.

This is to perform control such that operation is performed at a fixed refresh rate having BRR=120 Hz from the start, because it is not possible to perform operation for which the upper limit is 120 Hz when a variable refresh rate having a BRR set to 120 Hz is expected.

[Selection in Case where there are Multiple Variable Range Patterns]

Furthermore, in a case where multiple variable range patterns are present in the storage unit 12 when a variable range pattern is selected in step S16, the information processing apparatus 1 selects any one of these variable range patterns.

At this point, for example, if an application program to be executed has, as a target, a refresh rate for outputting, the information processing apparatus 1 may select a range that includes the refresh rate (such as an upper limit or a lower limit thereof being lowest or highest).

In addition, the information processing apparatus 1 may select a range that includes refresh rates that the display monitor 2 can support, with an upper limit or a lower limit thereof being a lowest refresh rate (or a highest refresh rate).

[Example of not Using Fixed Refresh Rate]

Note that, in the description thus far, the information processing apparatus 1, in accordance with conditions, performs display control at a fixed refresh rate even if the connected display monitor 2 supports a variable refresh rate (is connected to a display monitor 2 for which the refresh rate is variable) and an application program being executed is set to use a variable refresh rate.

However, in another example of the present embodiment, display control at a variable refresh rate may be always performed if there is a connection to a display monitor 2 for which the refresh rate is variable and an application program being executed is set to use a variable refresh rate.

In this another example, the information processing apparatus 1 determines, by a predefined limit range determination method, a variable range for a variable refresh rate to be within a partial limited range from among a range for refresh rates that the connected display monitor 2 can support. The display monitor 2 is controlled on the basis of the determined variable range. Specifically, it is assumed that the information processing apparatus 1 in this example, even in a case of having selected to perform display control at a fixed refresh rate in the example described thus far, selects one variable range pattern that is already described, if connected to a display monitor 2 for which the refresh rate is variable and if an application program being executed is set to use a variable refresh rate, and performs display control at a variable refresh rate in a range between the upper limit and the lower limit indicated by the selected variable range pattern.

[Method of Determining Limit Range]

In addition, the information processing apparatus 1 may select from among at least one variable range pattern that is defined in advance (corresponding to a combination candidate) and determine a partial limited range, which is from among a range of refresh rates that the above-described display monitor 2 can support, as a variable range for the variable refresh rate, but this is an example of a method of determining a limit range, and another method may be used.

For example, the information processing apparatus 1 may use prescribed functions that relate to one another, in other words, the above-described fmax and fmin exemplified in FIG. 2, to determine the lower limit and the upper limit for the limited range. In this example, the information processing apparatus 1 determines an $\alpha$ such that a value of a predefined target refresh rate is included in a range that is equal to or greater than fmin($\alpha$) and equal to or less than fmax($\alpha$). For example, the information processing apparatus 1 uses a target refresh rate value Rtarget to obtain $\alpha$ such that fmax($\alpha$)=Rtarget, sets the upper limit Rmax to Rtarget=fmax($\alpha$), and uses this $\alpha$ to set the lower limit Rmin to fmin($\alpha$).

[Changing Range]

Furthermore, the information processing apparatus 1 may determine the variable range for the variable refresh rate at a prescribed timing, for example, while the processing execution unit 110 in the control unit 11 is executing an application program, at each timing that is instructed by the application program.

In this case, the information processing apparatus 1 obtains information regarding the refresh rate for when the immediately prior frame is displayed. This information can be obtained from the display monitor 2. The information processing apparatus 1 determines the variable range for the variable refresh rate on the basis of the obtained information regarding the refresh rate for when the immediately prior frame is displayed. As an example, the information processing apparatus 1 defines a changed refresh rate target value Rtarget as follows.

In other words, the information processing apparatus 1 defines the changed refresh rate target value Rtarget according to an instruction by the application program. In this example, a creator of the application program sets the changed refresh rate target value in advance. Specifically, in a case of a game application, before transitioning to a scene that has rapid screen changes, the changed refresh rate target value is set to a relatively high value.

In addition, the information processing apparatus 1 may define the changed refresh rate target value on the basis of loads for displaying frames thus far. For example, the information processing apparatus 1 uses a refresh rate average value Rav (may be an arithmetic mean) for when past N frames (N is set to an integer that is equal to or greater than 1) are displayed, and a variable range (a lower limit Rmin and an upper limit Rmax) for a variable refresh rate for when the past N frames are displayed, and a value L that expresses the load is obtained by L=(Rav−Rmin)/(Rmax−Rmin). When the value L that expresses this load exceeds a predefined threshold, for example, 0.8, it is determined that the load with respect to the set variable range is high, and the changed refresh rate target value Rtarget is defined as Rav, for example.

Furthermore, the information processing apparatus 1 may execute processing for transitioning to a power saving mode. In a case of transitioning to a power saving mode, the changed refresh rate target value is set lower than the current target value. However, it is assumed that, when a refresh rate target value (an application target value) is set according to an instruction by an application program, the information processing apparatus 1 defines the changed refresh rate target value by employing the target value as a lower limit.

[Example of Causing Change Gradually]

Note that there are cases in which a refresh rate target value Rtarget defined by, inter alia, the information processing apparatus 1 being instructed by an application program is not included in a limit range that includes the above-described obtained refresh rate Rcurrent for when the immediately prior frame is displayed. In other words, using the fmax and fmin described above, in a case where

- an upper limit fmax($\alpha$) for a limit range expressed using an $\alpha$ that satisfies Rcurrent=fmin($\alpha$) is Rtarget>fmax($\alpha$) if Rtarget>Rcurrent, or
- a lower limit fmin($\alpha$) for a limit range expressed using an $\alpha$ that satisfies Rcurrent=fmax($\alpha$) is Rtarget<fmin($\alpha$) if Rtarget<Rcurrent, the information processing apparatus 1 determines that the refresh rate target value Rtarget is not included (it is not possible to reach the target value by a single change) in the limit range that includes the obtained refresh rate Rcurrent for when the immediately prior frame is displayed.

In this manner, in a case of having determined that the target value cannot be reached by a single change, the information processing apparatus 1 may operate as follows.

Figure 6:
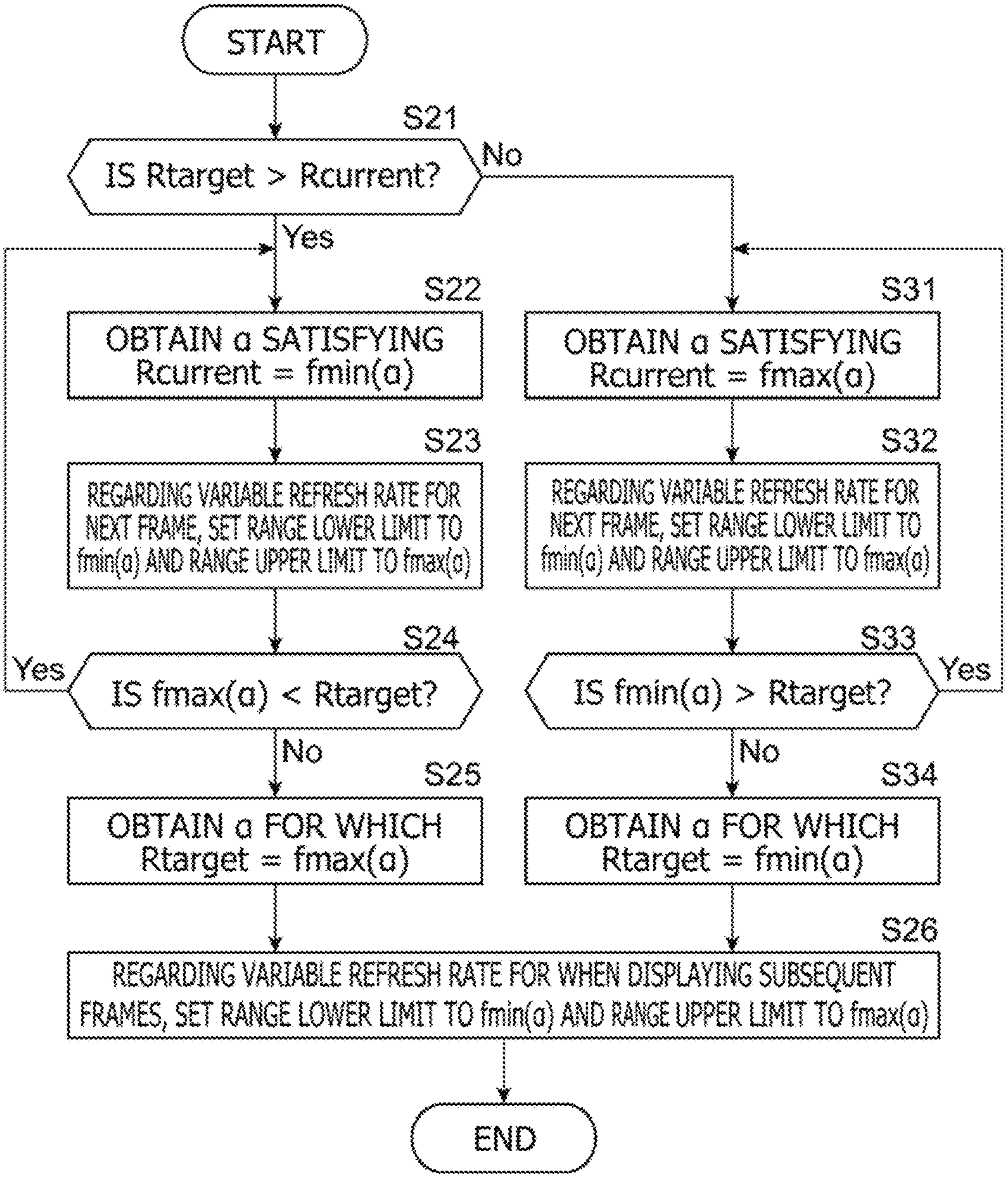
FIG. 6 is a flow chart that represents another example of operation by the information processing apparatus according to the embodiment of the present invention.

As exemplified in FIG. 6, the information processing apparatus 1 investigates whether or not Rtarget>Rcurrent (S21) and, if Rtarget>Rcurrent (S21: Yes), obtains an $\alpha$ that satisfies Rcurrent=fmin($\alpha$) (S22), and uses the $\alpha$ obtained here to set a lower limit fmin($\alpha$) and an upper limit fmax($\alpha$) for the variable range of a variable refresh rate for displaying the next frame (S23).

Hereinafter, the information processing apparatus 1 sets the refresh rate for when the next frame is displayed as Rcurrent and, while fmax($\alpha$)<Rtarget (S24: Yes), repeatedly executes steps S22 and S23. Upon determining that fmax($\alpha$)≥Rtarget is achieved (S24: No), the information processing apparatus 1 obtains an $\alpha$ for which Rtarget=fmax($\alpha$) (S25), uses the $\alpha$ obtained here to set the variable range having the lower limit fmin(α) and the upper limit fmax(α) for subsequent variable refresh rates (S26), and ends the processing.

In contrast, if Rtarget≤Rcurrent in step S21 (S21: No), the information processing apparatus 1 obtains an α that satisfies Rcurrent=fmax(α) (S31), and uses the α obtained here to set a lower limit fmin(α) and an upper limit fmax(α) for the variable range of a variable refresh rate for displaying the next frame (S32).

Hereinafter, the information processing apparatus 1 sets the refresh rate for when the next frame is displayed as Rcurrent and, while fmin(α)>Rtarget (S33: Yes), repeatedly executes steps S31 and S32. Upon determining that fmin(α)≤Rtarget is achieved (S33: No), the information processing apparatus 1 obtains an α for which Rtarget=fmin(α) (S34), transitions to step S26, uses the α obtained in step S34 to set the variable range having the lower limit fmin(α) and the upper limit fmax(α) for subsequent variable refresh rates, and ends the processing.

Note that, here, an α for which Rtarget=fmax(α) is obtained in step S25 and an α for which Rtarget=fmin(α) is obtained in step S34, but there is not necessarily a limitation to this example. In any process, the information processing apparatus 1 is only required to obtain an α that satisfies fmax(α)≥Rtarget≥fmin(α).

In this example of the present embodiment, it is possible to transition to control at a target value without deviating from a limit range, by taking an amount of time that is for display of multiple frames. As a result, it is possible to simplify program development, without requiring consideration of the model of a display monitor when a program that is executed by the information processing apparatus 1 itself is developed.

REFERENCE SIGNS LIST

1: Information processing apparatus
2: Display monitor
11: Control unit
12: Storage unit
13: Operation unit
14: Display control unit
110: Processing execution unit
111: Setting obtainment unit
112: Selection unit
113: Display monitor control unit

The invention claimed is:

1. An information processing apparatus that is connected to a display monitor and generates a video signal that is outputted to the display monitor, the information processing apparatus comprising:
- processing circuitry configured to:
- in a case where a refresh rate of the display monitor is variable, select one of:
  - a prescribed fixed refresh rate when a refresh rate setting designated by a system setting or relation with the information processing apparatus indicates that a variable refresh rate should not be used, and
  - a variable range that is for the variable refresh rate and is defined as a partial limited range from among a refresh range that the display monitor supports; and
- control the display monitor on a basis of the prescribed fixed refresh rate or the variable range.

2. The information processing apparatus according to claim 1, further comprising:
- a memory configured to hold at least one variable range pattern that includes a lower limit and an upper limit for the variable range that is for the variable refresh rate,
- wherein the processing circuitry is configured to select the variable range by selecting one of the at least one variable range patterns.

3. The information processing apparatus according to claim 1, wherein the processing circuitry is configured to:
- execute prescribed processing that includes processing for drawing a screen that is to be displayed by the display monitor,
- generate the video signal on a basis of the screen,
- refer to a refresh rate setting that is designated by a relation with the prescribed processing, and
- on a basis of the refresh rate setting, select the variable range or select the prescribed fixed refresh rate.

4. The information processing apparatus according to claim 2, wherein the processing circuitry is configured to:
- refer to the refresh rate of the display monitor, and
- select either the prescribed fixed refresh rate or one of the at least one variable range patterns based upon the refresh rate of the display monitor.

5. The information processing apparatus according to claim 4, wherein, in a case where the refresh rate of the display monitor is variable and there is no setting for forcing a fixed refresh rate, the processing circuitry is configured to select a fixed refresh rate in a case where an upper limit of the refresh rate of the display monitor is less than a base refresh rate for when a fixed refresh rate is set for the display monitor.

6. The information processing apparatus according to claim 2, wherein the processing circuitry is configured to:
- execute prescribed processing that includes processing for drawing a screen that is to be displayed by the display monitor,
- generate the video signal on a basis of the screen, and
- select either the prescribed fixed refresh rate or the one of the at least one variable range patterns, by referring to the refresh rate of the display monitor and a refresh rate setting that is designated by a relation with the prescribed processing.

7. The information processing apparatus according to claim 1, wherein the processing circuitry is configured to:
- execute prescribed processing that includes processing for drawing a screen that is to be displayed by the display monitor, and when the variable range is selected, define the variable range for the variable refresh rate at each of a prescribed timing.

8. The information processing apparatus according to claim 1, wherein the processing circuitry is configured to determine the variable range according to a prescribed pair of functions that respectively relate to a lower limit and an upper limit that express the variable range for the variable refresh rate.

9. A method for controlling an information processing apparatus that is connected to a display monitor and generates a video signal that is outputted to the display monitor, the method comprising:
- determining that a refresh rate of the display monitor is variable;
- in a case where the refresh rate of the display monitor is variable, selecting one of:
  - a prescribed fixed refresh rate when a refresh rate setting designated by a system setting or relation with the information processing apparatus indicates that a variable refresh rate should not be used, and a variable range that is for the variable refresh rate and is defined as a partial limited range from among a refresh range that the display monitor supports; and controlling the display monitor on a basis of the prescribed fixed refresh rate or the variable range.

10. A computer-readable non-transitory recording medium storing a program that is executed by an information processing apparatus that is connected to a display monitor and generates a video signal that is outputted to the display monitor, the program causing the information processing apparatus to perform a method, the method comprising:

in a case where a refresh rate of the display monitor is variable, selecting one of:

a prescribed fixed refresh rate when a refresh rate setting indicates that the variable refresh rate should not be used, and a variable range that is for the variable refresh rate and is defined as a partial limited range from among a refresh range that the display monitor supports; and controlling the display monitor on a basis of the prescribed fixed refresh rate or the variable range.

11. The information processing apparatus according to claim 1, wherein the processing circuitry is configured to:

execute prescribed processing that includes processing for drawing a screen that is to be displayed by the display monitor, generate the video signal on a basis of the screen, refer to a refresh rate setting that is designated by a relation with the prescribed processing, and on a basis of the refresh rate setting, define and select the variable range or select the prescribed fixed refresh rate.

12. The information processing apparatus according to claim 4, wherein, in a case where the refresh rate of the display monitor is variable and there is no setting for forcing a fixed refresh rate, the processing circuitry is configured to select a fixed refresh rate in a case where the display monitor is a prescribed limited display monitor.

13. The information processing apparatus according to claim 1, wherein the processing circuitry is configured to:

execute prescribed processing that includes processing for drawing a screen that is to be displayed by the display monitor, and when the variable range is selected, change the variable range.

14. The information processing apparatus according to claim 13, wherein the processing circuitry is configured to change the variable range on a basis of the prescribed processing.

15. The information processing apparatus according to claim 13, wherein the processing circuitry is configured to change the variable range on a basis of a load corresponding to displaying past frames.

16. The information processing apparatus according to claim 13, wherein the processing circuitry is configured to:

determine that the variable range cannot be changed by a single change, and change the variable range gradually.

17. The information processing apparatus according to claim 1, wherein the information processing apparatus is a game device, and the processing circuitry is configured to:

execute prescribed processing that includes processing for drawing a game screen that is to be displayed by the display monitor, generate the video signal on a basis of the game screen, refer to a refresh rate setting that is designated by a relation with the prescribed processing, and on a basis of the refresh rate setting, select the variable range or select the prescribed fixed refresh rate.

* * * * *